(12) United States Patent
Kim et al.

(10) Patent No.: US 12,387,360 B2
(45) Date of Patent: Aug. 12, 2025

(54) APPARATUS AND METHOD FOR ESTIMATING UNCERTAINTY OF IMAGE COORDINATE

(71) Applicants: SAMSUNG ELECTRONICS CO., LTD., Suwon-si (KR); Korea University Research and Business Foundation, Seoul (KR)

(72) Inventors: Yuntae Kim, Suwon-si (KR); Sanghoon Sull, Seoul (KR); Jaehyun Kim, Seoul (KR); Seongwook Yoon, Seoul (KR); Donghoon Sagong, Suwon-si (KR); Hojin Ju, Seongnam-si (KR); Jaehwan Pi, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 578 days.

(21) Appl. No.: 17/708,447

(22) Filed: Mar. 30, 2022

(65) Prior Publication Data

US 2023/0030596 A1 Feb. 2, 2023

(30) Foreign Application Priority Data

Jul. 27, 2021 (KR) .................. 10-2021-0098529
Sep. 27, 2021 (KR) .................. 10-2021-0127547

(51) Int. Cl.
*G06T 7/70* (2017.01)
*G06T 7/20* (2017.01)
(Continued)

(52) U.S. Cl.
CPC .............. *G06T 7/70* (2017.01); *G06T 7/20* (2013.01); *G06T 7/50* (2017.01); *G06T 7/579* (2017.01);
(Continued)

(58) Field of Classification Search
None
See application file for complete search history.

(56) References Cited

U.S. PATENT DOCUMENTS

2003/0123544 A1 7/2003 Prakash et al.
2007/0065039 A1 3/2007 Park et al.
(Continued)

FOREIGN PATENT DOCUMENTS

KR 10-2007-0033883 A 3/2007
KR 10-2009-0025662 A 3/2009
KR 10-1183781 B1 9/2012

OTHER PUBLICATIONS

Singh, "An Estimation-Theoretic Framework for Image-Flow Computation," IEEE, pp. 168-177, Conference Paper, Jan. 1991, Total 11 pages, DOI: 10.1109/ICCV.1990.139516.
(Continued)

*Primary Examiner* — Peter K Huntsinger
(74) *Attorney, Agent, or Firm* — Sughrue Mion, PLLC (57) ABSTRACT

An apparatus for estimating an uncertainty includes a processor configured to receive a first tracking coordinate corresponding to a reference coordinate, the reference coordinate being included in first image data acquired by a camera sensor, the first tracking coordinate including an image-based tracking coordinate in second image data acquired after the first image data; acquire, based on motion data acquired from a motion sensor and a depth value of the first image data, a second tracking coordinate corresponding to the reference coordinate, the second tracking coordinate including a motion-based tracking coordinate in the second image data; calculate a target coordinate distribution in the second image data based on the first tracking coordinate and the second tracking coordinate; acquire an estimated target coordinate and an uncertainty of the estimated target coor-
(Continued)

dinate based on the calculated target coordinate distribution; and update the first tracking coordinate based on the estimated target coordinate.

18 Claims, 7 Drawing Sheets

(51) Int. Cl.
  *G06T 7/50* (2017.01)
  *G06T 7/579* (2017.01)
(52) U.S. Cl.
  CPC ............... *G06T 2207/10028* (2013.01); *G06T 2207/20076* (2013.01); *G06T 2207/30244* (2013.01)

(56) References Cited

U.S. PATENT DOCUMENTS

| 2009/0066646 | A1 | 3/2009 | Choi et al. |
| 2014/0078313 | A1 | 3/2014 | Son et al. |
| 2016/0260251 | A1 | 9/2016 | Stafford et al. |
| 2021/0406560 | A1* | 12/2021 | Park .................. G06T 7/70 |
| 2023/0117498 | A1* | 4/2023 | Alcantarilla ........... G06V 10/44 382/103 |

OTHER PUBLICATIONS

Nickels et al., "Estimating uncertainty in SSD-based feature tracking," Image and Vision Computing, vol. 20, pp. 47-58, 2002.
Sheorey et al., "Uncertainty estimation for KLT tracking," Published in ACCV Workshops 1, Nov. 2014, Total 14 pages.
Wong et al., "Uncertainty Quantification of Lucas Kanade Feature Track and Application to Visual Odometry," CVPR, pp. 10-18, Date of Conference: Jul. 21-26, 2017.
Bouguet, "Pyramidal implementation of the Affine Lucas Kanade Feature Tracker Description of the algorithm," 2001, Total 10 pages.
Schnabel et al., "Efficient RANSAC for Point-Cloud Shape Detection," The Eurographics Association and Blackwell Publishing, vol. 26, No. 2, 2007, Total 12 pages.
Mustaniemi et al., "Fast Motion Deblurring for Feature Detection and Matching Using Inertial Measurements," arXiv:1805.08542v1 [cs.CV], May 2018, Total 6 pages.
Mustaniemi et al., "Gyroscope-Aided Motion Deblurring with Deep Networks," arXiv:1810.00986v2 [cs.CV], Nov. 2018, Total 9 pages.
Qin et al., "VINS-Mono: A Robust and Versatile Monocular Visual-Inertial State Estimator," arXiv:1708.03852v1 [cs.RO], Aug. 2017, Total 17 pages.
Li et al., "Survey and evaluation of monocular visual-inertial SLAM algorithms for augmented reality," Virtual Reality & Intelligent Hardware, vol. 1, Issue 4, pp. 386-410, 2019.
Hartley et al., "Multiple View Geometry in Computer Vision," Second Edition, Total 673 pages, 2001.

* cited by examiner

APPARATUS AND METHOD FOR ESTIMATING UNCERTAINTY OF IMAGE COORDINATE

CROSS-REFERENCE TO RELATED APPLICATIONS

This application is based on and claims priority under 35 U.S.C. § 119 to Korean Patent Applications No. 10-2021-0098529, filed on Jul. 27, 2021, and No. 10-2021-0127547, filed on Sep. 27, 2021, in the Korean Intellectual Property Office, the disclosures of which are incorporated by reference herein in their entireties.

BACKGROUND

1. Field

The disclosure relates to apparatuses and methods for estimating the uncertainty of an image coordinate in order to acquire a tracking coordinate of image data.

2. Description of Related Art

In the fields of computer vision and robotics, visual odometry (VO) and simultaneous localization and mapping (SLAM) technologies have been studied. In particular, these technologies may be applied to autonomous navigation and augmented reality, which have become increasingly popular.

For the feature-based visual odometry and SLAM technologies, an image coordinate tracking method may be applied in which continuous image data is acquired through a moving camera sensor and a relationship among portions of the continuous image data is analyzed by tracking coordinate movement in the acquired image data. In the image coordinate tracking method, a target coordinate in current image data is determined with respect to a specific coordinate in past image data. In this case, the specific coordinate in the past image data and the target coordinate in the current image data may be substantially the same point.

In a general image coordinate tracking method, a coordinate in current image data having a peripheral image that is most similar to a peripheral image of a specific coordinate in the past image data may be assumed as being a target coordinate. Afterwards, pairs that are clearly distinguished from a plurality of pairs formed by a specific coordinate in the past image data and a target coordinate in the current image data are estimated as indicate a tracking failure, and the tracking method is repeated to improve the reliability thereof.

SUMMARY

In tracking a coordinate movement by acquiring continuous image data from a moving camera sensor, the tracking result of the moving camera sensor may vary greatly depending on a change in visual characteristics. For example, when the motion of a camera sensor is large, deterioration of visual features, such as motion blur, illumination change, and occlusion, may be caused. In particular, when a motion blur is caused, a plurality of coordinates similar to a specific coordinate in past image data may be distributed in a direction in which the motion blur is caused, which makes it difficult to estimate a target coordinate. Also, error occurrence may be accumulated due to difficulty in estimating the target coordinate, and accordingly, the accuracy of image coordinate tracking may be greatly reduced.

Accordingly, provided are apparatuses for estimating a target coordinate by using a motion sensor as well as a camera sensor and acquiring uncertainty of the estimated target coordinate, and operating methods thereof.

The problems to be solved through the embodiments of the disclosure are not limited to the problems described above, and problems not mentioned are clearly understood by those of ordinary skill in the art to which the embodiments belong from the disclosure and the accompanying drawings.

Additional aspects will be set forth in part in the description which follows and, in part, will be apparent from the description, or may be learned by practice of embodiments of the disclosure.

In accordance with an aspect of the disclosure, an apparatus for estimating an uncertainty includes a processor configured to estimate an uncertainty of an image coordinate by executing at least one program, wherein the processor is further configured to receive a first tracking coordinate that corresponds to a reference coordinate, the reference coordinate being included in first image data acquired by a camera sensor, wherein the first tracking coordinate includes an image-based tracking coordinate in second image data acquired after the first image data; acquire, based on motion data acquired from a motion sensor and a depth value of the first image data, a second tracking coordinate that corresponds to the reference coordinate, wherein the second tracking coordinate includes a motion-based tracking coordinate in the second image data; calculate a target coordinate distribution in the second image data based on the first tracking coordinate and the second tracking coordinate; acquire an estimated target coordinate and an uncertainty of the estimated target coordinate based on the calculated target coordinate distribution; and update the first tracking coordinate based on the estimated target coordinate.

The processor may be further configured to acquire a first three-dimensional (3D) coordinate with respect to the reference coordinate based on the depth value of the first image data; convert the first 3D coordinate into a second 3D coordinate in the second image data based on the motion data; and acquire the second tracking coordinate by projecting the second 3D coordinate.

The processor may be further configured to, for each of a plurality of coordinates included in the second image data, calculate a weighted average of a first distance value and a second distance value, the first distance value being between the coordinate and the first tracking coordinate and the second distance value being between the coordinate and the second tracking coordinate; for each of the plurality of coordinates, calculate a prior probability distribution based on the calculated weighted average; determine a portion of the prior probability distribution having a prior probability greater than or equal to a threshold value as a candidate coordinate group; and calculate the target coordinate distribution based on the candidate coordinate group.

The processor may be further configured to, for each of the plurality of coordinates, when a value included in the motion data is less than a preset value, set a weight parameter corresponding to the first distance value to be greater than a weight parameter corresponding to the second tracking coordinate.

The processor may be further configured to calculate an image-based distribution based on image similarity with the reference coordinate for the determined candidate coordinate group.

The processor may be further configured to calculate the target coordinate distribution based on the prior probability distribution and the image-based distribution.

The processor may be further configured to transmit the updated first tracking coordinate and the uncertainty of the estimated target coordinate to an external apparatus.

The processor may be further configured to estimate a target coordinate by calculating an average of the target coordinate distribution, and estimate the uncertainty of the estimated target coordinate by calculating a covariance matrix for the estimated target coordinate.

In accordance with an aspect of the disclosure, a method of estimating an uncertainty includes receiving a first tracking coordinate that corresponds to a reference coordinate, the reference coordinate being included in first image data acquired by a camera sensor, wherein the first tracking coordinate includes an image-based tracking coordinate in second image data acquired after the first image data; acquiring, based on motion data acquired from a motion sensor and a depth value of the first image data, a second tracking coordinate that corresponds to the reference coordinate, wherein the second tracking coordinate includes a motion-based tracking coordinate in the second image data; calculating a target coordinate distribution in the second image data based on the first tracking coordinate and the second tracking coordinate; acquiring an estimated target coordinate and an uncertainty of the estimated target coordinate based on the calculated target coordinate distribution; and updating the first tracking coordinate based on the estimated target coordinate.

The acquiring of the second tracking coordinate may include acquiring a first 3D coordinate with respect to the reference coordinate based on the depth value of the first image data; converting the 3D coordinate into a second 3D coordinate in the second image data based on the motion data; and acquiring the second tracking coordinate by projecting the converted second 3D coordinate.

The method may further include, for each of a plurality of coordinates included in the second image data, calculating a weighted average of a first distance value and a second distance value, the first distance value being between the coordinate and the first tracking coordinate and the second distance value being between the coordinate and the second tracking coordinate; for each of the plurality of coordinates, calculating a prior probability distribution based on the calculated weighted average; determining, from among the prior probability distributions, coordinates from among the plurality of coordinates having a prior probability greater than or equal to a threshold value as a candidate coordinate group for the estimated target coordinate; and calculating the target coordinate distribution based on the candidate coordinate group.

The method may further include calculating an image-based distribution for the determined candidate coordinate group based on image similarity with the reference coordinate.

The method may further include calculating the target coordinate distribution based on the prior probability distribution and the image-based distribution.

The method may further include transmitting the updated first tracking coordinate and the uncertainty of the estimated target coordinate to an external apparatus.

The method may further include estimating a target coordinate by calculating an average of the target coordinate distribution, and estimating the uncertainty of the estimated target coordinate by calculating a covariance matrix for the estimated target coordinate.

In accordance with an aspect of the disclosure, an electronic apparatus for performing a simultaneous localization and mapping (SLAM) operation includes a camera sensor configured to acquire image data about a surrounding environment; a motion sensor configured to acquire motion data by detecting a rotation and a movement of the electronic apparatus; and a processor electrically connected to the camera sensor and the motion sensor, wherein the processor is configured to receive a first tracking coordinate that corresponds to a reference coordinate, the reference coordinate being included in first image data acquired by the camera sensor, the first tracking coordinate including an image-based tracking coordinate in second image data acquired after the first image data; acquire, based on the motion data acquired from the motion sensor and a depth value of the first image data, a second tracking coordinate that corresponds to the reference coordinate and is a motion-based tracking coordinate in the second image data; calculate a target coordinate distribution in the second image data based on the first tracking coordinate and the second tracking coordinate; acquire an estimated target coordinate and an uncertainty of the estimated target coordinate based on the calculated target coordinate distribution; and update the first tracking coordinate based on the estimated target coordinate.

The processor may be further configured to acquire a first 3D coordinate with respect to the reference coordinate based on the depth value of the first image data; convert the first 3D coordinate into a second 3D coordinate in the second image data based on the motion data; and acquire the second tracking coordinate by projecting the converted second 3D coordinate.

The electronic apparatus may further include a back-end processor configured to calculate a rotation angle and a position of the camera sensor, wherein the processor is further configured to transmit the updated first tracking coordinate and the uncertainty of the estimated target coordinate to the back-end processor.

The processor may be further configured to estimate a target coordinate by calculating an average of the target coordinate distribution, and estimate the uncertainty of the estimated target coordinate by calculating a covariance matrix with respect to the estimated target coordinate.

The processor may be further configured to display an image corresponding to the updated first tracking coordinate.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

In the descriptions of the embodiments, it will be understood that, when an element is referred to as being connected to another element, it may include electrically connected when the element is directly connected to the other element and when the element is indirectly connected to the other element by intervening a constituent element. Also, it should be understood that, when a part "comprises" or "includes" a constituent element in the specification, unless otherwise defined, it is not excluding other elements but may further include other elements.

The term "comprises" or "includes" used in the embodiments should not be construed as necessarily including various constituent elements and various operations described in the specification, and also should not be construed that portions of the constituent elements or operations of the various constituent elements and various operations may not be included or additional constituent elements and operations may further be included.

It will be understood that, although the terms 'first', 'second', etc. may be used herein to describe various constituent elements, these constituent elements should not be limited by these terms. These terms are only used to distinguish one constituent element from another.

Also, the 'world coordinate system' used in the disclosure may denote a three-dimensional coordinate system set based on the real world.

The descriptions of the embodiments should not be interpreted as limiting the scope of right, and embodiments that are readily inferred from the detailed descriptions and embodiments by those of ordinary skill in the art will be construed as being included in the disclosure. Reference will now be made in detail to embodiments, examples of which are illustrated in the accompanying drawings.

Figure 1:
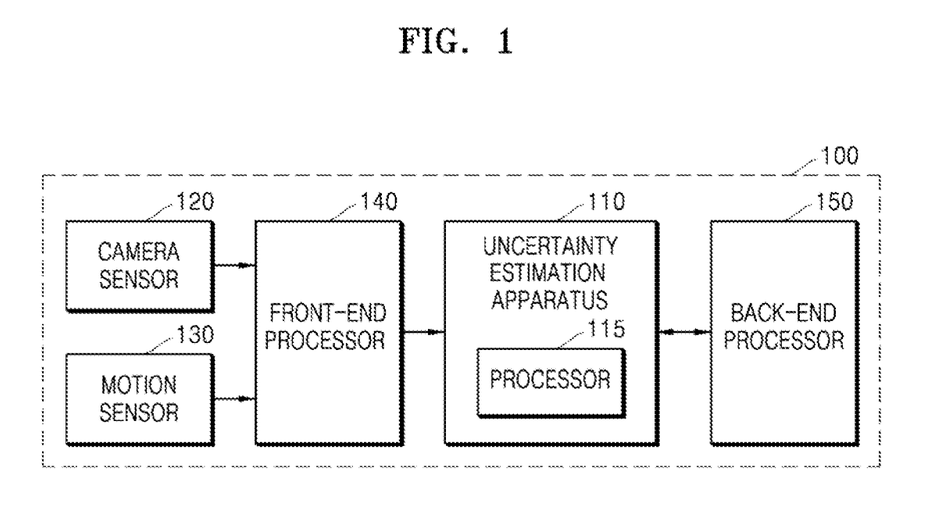
FIG. 1 is a block diagram of an electronic apparatus according to an embodiment.

FIG. 1 is a block diagram of an electronic apparatus 100 according to an embodiment.

Referring to FIG. 1, the electronic apparatus 100 according to an embodiment includes an uncertainty estimation apparatus 110, a camera sensor 120, a motion sensor 130, a front-end processor 140, and a back-end processor 150.

In an embodiment, the electronic apparatus 100 may be an electronic apparatus configured to recognize a current pose of the electronic apparatus 100 in a three-dimensional space based on image information acquired from the camera sensor 120 and to model a surrounding environment. The electronic apparatus 100 may be an electronic apparatus to which visual odometry (VO), visual simultaneous localization and mapping (V-SLAM), and/or visual-inertial odometry (VIO) technology are applied. For example, as the VO, V-SLAM, and/or VIO technologies are applied, the electronic apparatus 100 may be an electronic apparatus configured to provide autonomous flying drones, robots, autonomous vehicles, virtual reality and/or augmented reality (e.g., smart glass). However, the disclosure is not limited thereto, and the electronic apparatus 100 may include various electronic apparatuses to which the above technologies are applied.

In an embodiment, the camera sensor 120 may acquire image data about a surrounding environment. For example, the camera sensor 120 may correspond to an omnidirectional camera, a stereo camera, or a mono camera. In an embodiment, the camera sensor 120 may acquire image data including 3D information of various objects (e.g., static and/or dynamic objects) in a dynamic environment. In this case, the image data acquired by the camera sensor 120 may include not only image data of each pixel but also depth data of each pixel.

In an embodiment, the motion sensor 130 may acquire motion data by detecting rotation (e.g., a rotation angle) and translation of the electronic apparatus 100. For example, the motion sensor 130 may be an inertial measurement unit (IMU) including an acceleration sensor and/or a gyro sensor.

In an embodiment, the front-end processor 140 may process data received from the camera sensor 120 and the motion sensor 130. For example, the front-end processor 140 may acquire data for tracking an image coordinate by processing data received from the camera sensor 120 and the motion sensor 130.

In an embodiment, the front-end processor 140 may analyze image data received from the camera sensor 120. For example, the front-end processor 140 may acquire a visual correspondence by analyzing the image data. In the disclosure, a 'visual correspondence' may denote a relationship between two-dimensional coordinates projected for each of image data in which a specific three-dimensional coordinate is continuously acquired.

In an embodiment, the front-end processor 140 may acquire a tracking coordinate through an image coordinate tracking algorithm. That is, the front-end processor 140 may acquire a visual correspondence between a plurality of image data received from the camera sensor 120 by using an image coordinate tracking algorithm, and may acquire the tracking coordinate based on the acquired visual correspondence.

For example, the front-end processor 140 may receive first image data from the camera sensor 120. In this case, the front-end processor 140 may set a reference coordinate $(x_r)$ of the first image data, and a reference coordinate may be set to correspond to a key point. After receiving the first image data, the front-end processor 140 may receive second image data from the camera sensor 120. The front-end processor 140 may acquire a visual correspondence based on the image similarity of the first image data and the second image data. In this case, the front-end processor 140 may calculate an image similarity between the reference coordinate ($x_r$) set in the first image data and an arbitrary coordinate (x) in the second image data, and the image similarity may be calculated through Equation 1.

$$\text{Image similarity} = -\sqrt{\frac{1}{(2N+1)^2} \sum_{-N \leq x, y \leq N} (I_1[x_r + (x, y)] - I_2[x + (x, y)])^2}. \quad \text{[Equation 1]}$$

That is, the image similarity may be calculated as a root mean square error (RMSE) of pixel values in the square of (2N+1)×(2N+1) around a coordinate. The front-end processor 140 may determine a coordinate at which the image similarity is maximized as a first tracking coordinate ($x_V$) through the Kanade-Lucas-Tomasi (KLT) algorithm. In this case, the 'first tracking coordinate ($x_V$)' may denote an image-based tracking coordinate.

In an embodiment, the front-end processor 140 may estimate an inertial pose based on motion data received from the motion sensor 130. For example, when the motion sensor 130 is a 6DoF inertial measurement device, the front-end processor 140 may receive 3-axis linear acceleration and 3-axis angular velocity from the motion sensor 130. The front-end processor 140 may integrate data about the linear acceleration and the angular velocity by estimating an initial velocity and a bias value of a sensor. In this case, as the front-end processor 140 estimates and integrates the initial velocity and the bias value of the sensor, accumulation of errors may be prevented. The front-end processor 140 may estimate an inertial pose (e.g., (R,t) by integrating the data by estimating an initial velocity and a bias value of the sensor.

In an embodiment, the front-end processor 140 may estimate a depth value (d) of image data based on the first tracking coordinate ($x_V$), which is an image-based tracking coordinate, and motion data. For example, the front-end processor 140 may estimate a depth value (d) of the image data by performing triangulation based on the first tracking coordinate ($x_V$) and the motion data.

In an embodiment, the front-end processor 140 may transmit data about the first tracking coordinate ($x_V$), the inertia pose (R,t), and the depth value (d) of the image data to the uncertainty estimation apparatus 110.

With further reference to FIG. 1, in an embodiment, the uncertainty estimation apparatus 110 may include at least one processor 115. For example, the processor 115 may include an embedded processor, a micro-processor, a hardware control logic, a finite state machine (FSM), or a digital signal processing (DSP) or a combination thereof.

In the disclosure, the 'uncertainty estimation apparatus' refers to an apparatus for estimating uncertainty of a visual correspondence, and specifically, may refer to an apparatus for estimating a probability difference between a visual correspondence and an actual correspondence. Also, the uncertainty estimation apparatus 110 may include at least one processor 115, but is not limited thereto, and the at least one processor 115 may itself be the uncertainty estimation apparatus 110.

In one embodiment, the processor 115 may determine a second tracking coordinate ($x_m$) based on the first tracking coordinate ($x_V$), the inertial pose (R,t) and the depth value (d) of the image data received from the front-end processor 140. In this case, the 'second tracking coordinate ($x_m$)' may denote a motion-based tracking coordinate. A detailed description of a method for the processor 115 to determine the second tracking coordinate ($x_m$) will be described below with reference to FIG. 4.

In an embodiment, after determining the second tracking coordinate ($x_m$), the processor 115 may calculate a target coordinate distribution in second image data through a series of operations. For example, the processor 115 may finally calculate a target coordinate distribution in the second image data through performing an operation of calculating a prior probability distribution (operation 1), an operation of determining a candidate coordinate group (operation 2), and an operation of calculating an image-based distribution (operation 3). A detailed description for the processor 115 to calculate the target coordinate distribution in the second image data will be described below with reference to FIG. 5.

In an embodiment, the processor 115 may acquire a plurality of target coordinate distributions and a plurality of grids ($X_n$) by repeating the process of calculating the target coordinate distribution for the plurality of second tracking coordinates ($x_m^n$). The processor 115 may acquire an estimated target coordinate ($\mu$) and the uncertainty ($\Sigma$) of the estimated target coordinate based on the plurality of target coordinate distributions and the plurality of grids ($X_n$). For example, the processor 115 may acquire the estimated target coordinate ($\mu$) by calculating an average for a plurality of target coordinate distributions, and acquire the uncertainty ($\Sigma$) of the estimated target coordinate by calculating a covariance matrix for the estimated target coordinate. A detailed description of a method by which the processor 115 acquires the estimated target coordinate ($\mu$) and the uncertainty (E) of the estimated target coordinate will be described below with reference to FIG. 5.

In an embodiment, the processor 115 may update the first tracking coordinate ($x_V$) received from the front-end processor 140 based on the acquired estimated target coordinate ($\mu$). That is, the updated first tracking coordinate may denote the same coordinate as the acquired estimated target coordinate ($\mu$). Thereafter, the processor 115 may transmit the updated first tracking coordinate ($\mu$) and uncertainty ($\Sigma$) to the back-end processor 150 (e.g., to an external apparatus). For example, the processor 115 may transmit the updated first tracking coordinate ($\mu$) to be displayed on a display or may transmit the updated first tracking coordinate ($\mu$) to another device for use in an application relating to autonomous navigation or augmented reality.

In an embodiment, the back-end processor 150 may receive the first tracking coordinate ($\mu$) and the uncertainty updated from the uncertainty estimation apparatus 110, and receive an estimated inertial pose (R,t) from the front-end processor 140. The back-end processor 150 may calculate a pose (e.g., a position and an orientation) of the camera sensor 120 based on the received data. Also, the back-end processor 150 may transmit a result of performing optimization through a Kalman filter and/or bundle adjustment to the uncertainty estimation apparatus 110. For example, the back-end processor 150 may transmit the result data of calculating and optimizing a pose of the camera sensor 120 (e.g., a depth value (d) of the second image data) to the uncertainty estimation apparatus 110.

Figure 2:
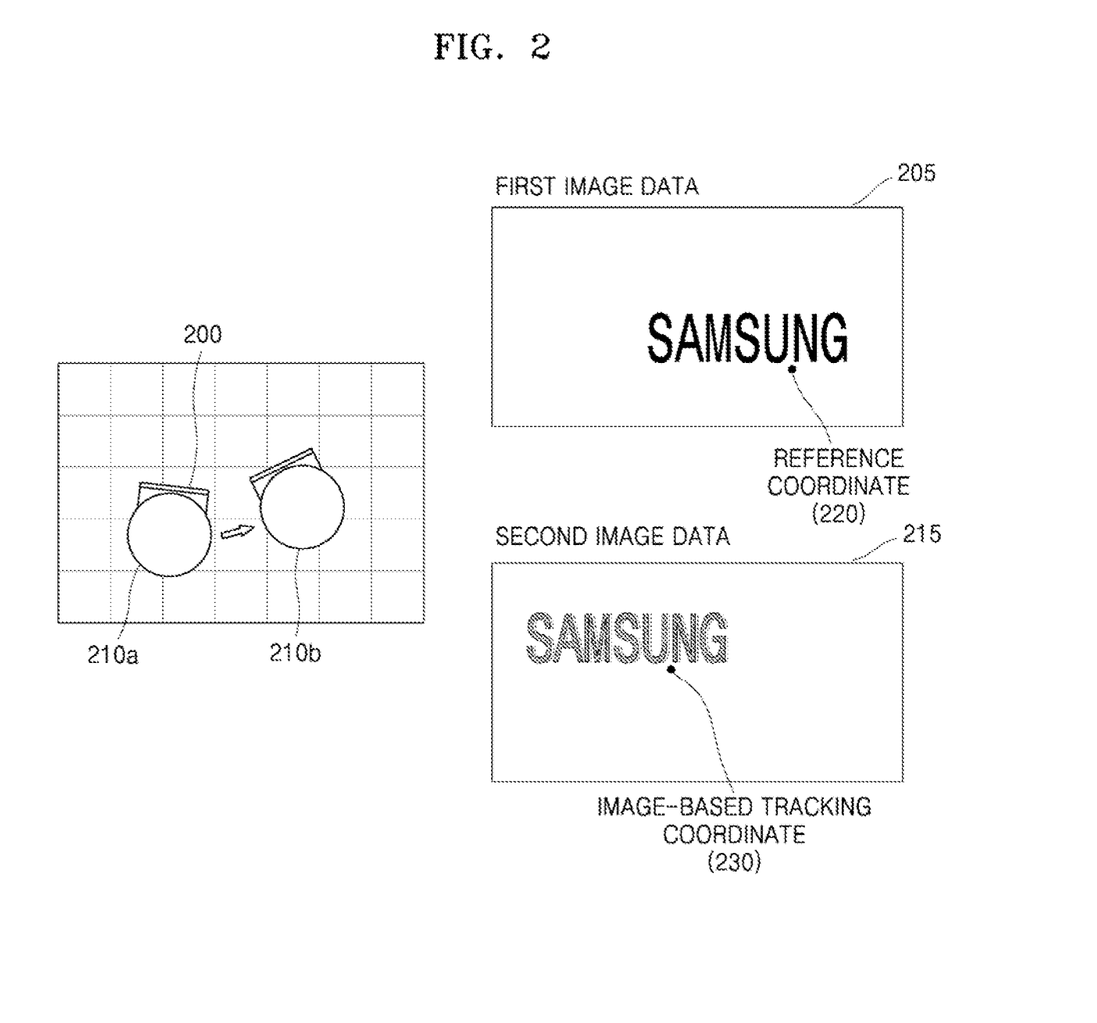
FIG. 2 is an example diagram for explaining a conventional method of tracking an image coordinate.

FIG. 2 is an example diagram for explaining a conventional method of tracking an image coordinate.

Referring to FIG. 2, according to the movement of a user wearing an electronic apparatus 200, the electronic apparatus 200 may output image data to which the user's movement is reflected through a display. For example, when a user's pose changes from a first pose 210a to a second pose 210b according to the movement of the user wearing the electronic apparatus 200, the electronic apparatus 200 may output image data to which the change of pose is reflected through the display. In this case, the first pose 210a may include the position and orientation of the user who wears the electronic apparatus 200 at the first time point. The second pose 210b may include the position and orientation of the user who wears the electronic apparatus 200 at a second time point which is later than the first time point.

In an embodiment, the electronic apparatus 200 may track an image coordinate through a conventional image coordinate tracking algorithm. That is, the electronic apparatus 200 may track the image coordinate only through a visual correspondence between continuous image data acquired through a camera (e.g., the camera sensor 120 of FIG. 1).

For example, the electronic apparatus 200 may set a reference coordinate 220 of first image data 205 at a first time point. In this case, the reference coordinate 220 may refer to a coordinate that is easily identified even if a viewpoint of the camera or a surrounding environment changes. The reference coordinate 220 may be set through a key point extraction method (e.g., Harris Corner method).

Thereafter, as the user wearing the electronic apparatus 200 moves, the electronic apparatus 200 may output second image data 215 at the second time point. At this time, if the user's movement is large, motion blur may be caused in the second image data 215, and the first image data 205 and the second image data 215 are flattened due to a difference in the image, and thus, the identification of the coordinate may be difficult. Although the electronic apparatus 200 samples an image difference occurred between the first image data 205 and the second image data 215, because a plurality of coordinates similar to the reference coordinate 220 are distributed in the second image data 215, the effect of the sampling may be reduced. Accordingly, if the effect of sampling on the image difference between the first image data 205 and the second image data 215 is reduced, the probability distribution for a final target coordinate may be inaccurate, and as a result, the uncertainty calculation may be disturbed.

Figure 3:
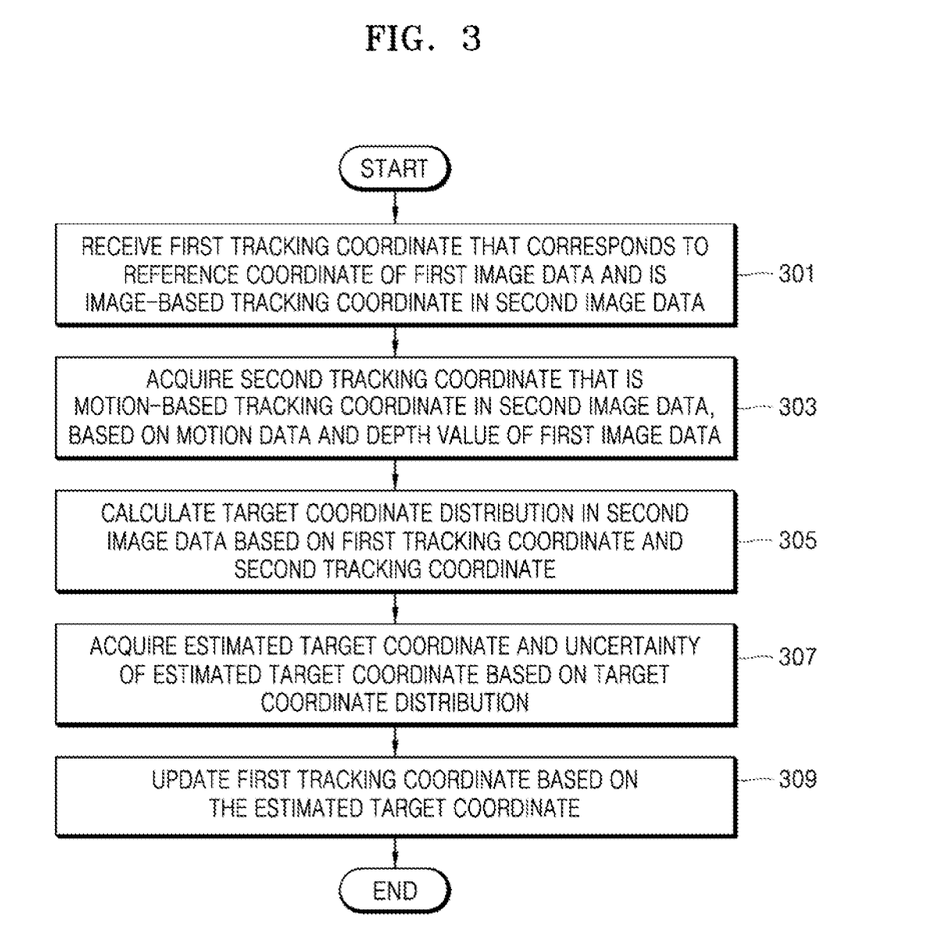
FIG. 3 is a flowchart for explaining a method used by an apparatus to estimate an uncertainty of tracking a coordinate according to an embodiment.

FIG. 3 is a flowchart for explaining a method used by an apparatus to estimate an uncertainty of tracking a coordinate according to an embodiment.

Referring to FIG. 3, in operation 301, a processor (e.g., the processor 115 of FIG. 1) of an uncertainty estimation apparatus (e.g., the uncertainty estimation apparatus 110 of FIG. 1) may receive a first tracking coordinate ($x_V$) that is an image-based tracking coordinate in the second image data. The first tracking coordinate ($x_V$) may correspond to a reference coordinate ($x_r$) of first image data.

In the disclosure, 'second image data' may denote image data acquired after 'first image data', and 'first image data' and 'second image data' may each denote continuous image data. In addition, the uncertainty estimation apparatus in the present disclosure may estimate an uncertainty of a target coordinate with respect to the 'second image data' having a large image difference from the 'first image data' due to motion blur caused by a large movement of a user, parallax, or lighting change.

In an embodiment, the processor 115 may receive the first tracking coordinate ($x_V$) that is an image-based tracking coordinate in the second image data from the front-end processor 140. The front-end processor 140 may acquire a visual correspondence based on an image similarity of the first image data and the second image data, and may determine the first tracking coordinate ($x_V$) based on the acquired visual correspondence. For example, the front-end processor 140 may calculate the image similarity between the reference coordinate ($x_r$) set in the first image data and an arbitrary coordinate (x) in the second image data, and may determine a coordinate at which the image similarity is maximized as the first tracking coordinate ($x_V$) through the KLT algorithm.

According to an embodiment, in operation 303, the processor 115 may acquire a second tracking coordinate ($x_m$) that is a motion-based tracking coordinate in the second image data. In an embodiment, the processor 115 may acquire the second tracking coordinate ($x_m$) based on motion data received from the front-end processor 140 and a depth value (d) of the first image data. In this case, the 'motion data' may denote an inertial pose (R,t) estimated from the front-end processor 140, and the 'depth value (d) of the first image data' may denote a depth value (d) estimated by the front-end processor 140 through triangulation.

For example, the processor 115 may convert the reference coordinate (x) in the first image data into a three-dimensional (3D) coordinate (e.g., a first 3D coordinate) based on the depth value (d) of the first image data. With respect to the converted 3D coordinate, the processor 115 may convert the converted 3D coordinate into a 3D coordinate in the second image data (e.g., a second 3D coordinate) by applying an inertial pose (R,t) received from the front-end processor 140. In addition, the processor 115 may acquire a second tracking coordinate ($x_m$) by projecting the 3D coordinate in the second image data.

According to an embodiment, in operation 305, the processor 115 may calculate a target coordinate distribution in the second image data. In the disclosure, the 'target coordinate distribution' may denote a probability distribution of a coordinate to which the reference coordinate ($x_r$) of the first image data substantially corresponds among the coordinates of the second image data.

In an embodiment, the processor 115 may calculate a target coordinate distribution based on the first tracking coordinate ($x_V$) that is an image-based tracking coordinate and the second tracking coordinate ($x_m$) that is a motion-based tracking coordinate in the second image data. For example, the processor 115 may finally calculate a target coordinate distribution in the second image data through performing an operation of calculating a prior probability distribution (operation 1), an operation of determining a candidate coordinate group (operation 2), and an operation of calculating an image-based distribution (operation 3). A detailed description about the method of calculating a target coordinate distribution in the second image data by the processor 115 will be described below with reference to FIG. 5.

According to an embodiment, in operation 307, the processor 115 may acquire an estimated target coordinate and the uncertainty of the estimated target coordinate. In the disclosure, the 'target coordinate' may denote a coordinate substantially corresponding to the reference coordinate of the first image data, and the 'estimated target coordinate' may denote a coordinate estimated to correspond to the reference coordinate of the first image data. In this case, the 'estimated target coordinate' may be an image-based tracking coordinate (e.g., the first tracking coordinate ($x_V$)).

In an embodiment, the processor 115 may acquire the estimated target coordinate and the uncertainty of the estimated target coordinate based on the target coordinate distribution calculated in operation 305. For example, the processor 115 may acquire a plurality of target coordinate distributions and a plurality of grids ($X_n$) by repeating the process of calculating the target coordinate distribution with respect to the plurality of second tracking coordinates ($x_m''$). The processor 115 may acquire the estimated target coordinate ($\mu$) and the uncertainty ($\Sigma$) of the estimated target coordinate based on the plurality of target coordinate distributions and the plurality of grids ($X_n$). For example, the processor 115 may acquire an estimated target coordinate ($\mu$) by calculating an average for a plurality of target coordinate distributions, and may acquire the uncertainty ($\Sigma$) of the estimated target coordinate by calculating a covariance matrix for the estimated target coordinate.

According to an embodiment, in operation 309, the processor 115 may update the first tracking coordinate based on the estimated target coordinate ($\mu$). For example, the processor 115 may update and set the estimated target coordinate ($\mu$), which is an average of a plurality of target coordinate distributions, as the first tracking coordinate that is an image-based tracking coordinate of the second image data.

Figure 4:
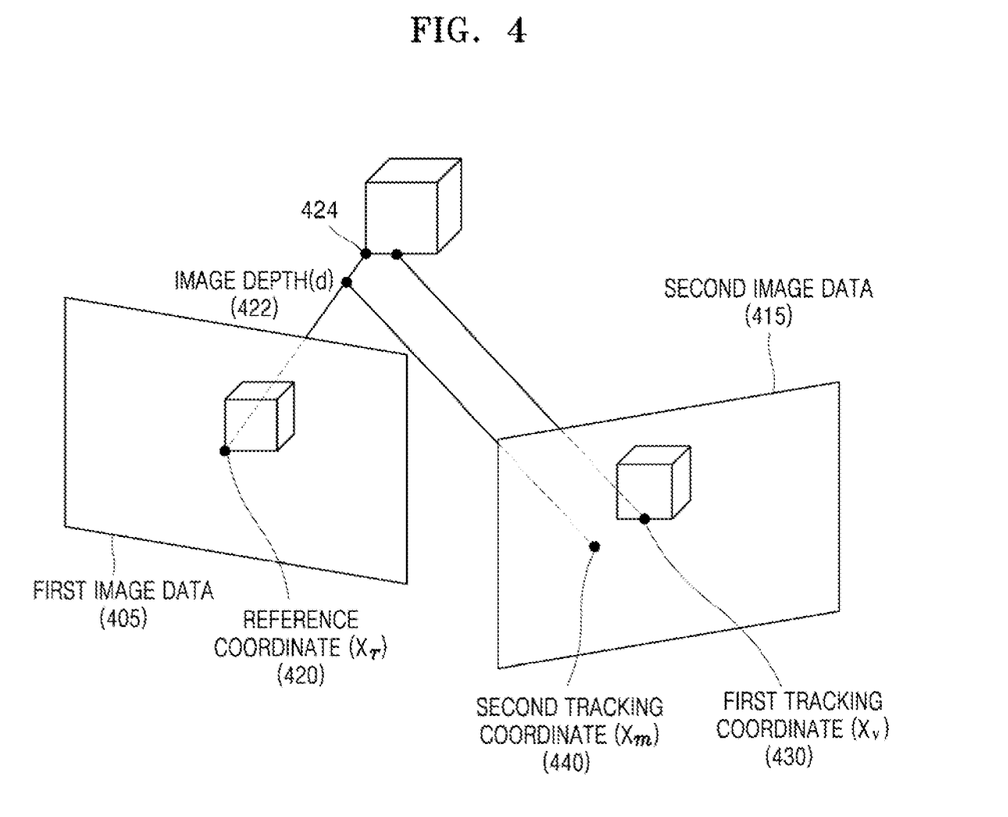
FIG. 4 is an example diagram for explaining a method used by an electronic apparatus to acquire a motion-based tracking coordinate according to an embodiment.

FIG. 4 is an example diagram for explaining a method for an electronic apparatus to acquire a motion-based tracking coordinate according to an embodiment.

Referring to FIG. 4, an electronic apparatus (e.g., the electronic apparatus 100 of FIG. 1) may output image data through a display. For example, the electronic apparatus 100 may output first image data 405 including a cube-shaped object.

In an embodiment, a front-end processor (e.g., the front-end processor 140 of FIG. 1) may set a reference coordinate ($x_r$) 420 of the first image data 405. For example, the front-end processor 140 may set a feature point (e.g., a corner point of the cube-shaped object) of the first image data 405 as the reference coordinate ($x_r$) 420.

In an embodiment, the front-end processor 140 may determine a first tracking coordinate ($x_V$) 430 that is an image-based tracking coordinate based on the image similarity of the first image data 405 and the second image data 415.

In an embodiment, the front-end processor 140 may estimate an inertial pose based on motion data received from a motion sensor (e.g., the motion sensor 130 of FIG. 1). For example, the front-end processor 140 may integrate data on a linear acceleration and angular velocity by estimating initial velocity and bias values of the motion sensor 130, and may estimate an inertial pose (R,t) as a result of the integration.

In an embodiment, the front-end processor 140 may acquire a depth value (d) 422 of the first image data 405 from a camera sensor (e.g., the camera sensor 120 of FIG. 1). For example, when the camera sensor 120 recognizes a 3D depth value of image data through a stereoscopy-type method, a time-of-flight (ToF) method, a structured pattern method, or the like, the front-end processor 140 may acquire the depth value (d) 422 of the first image data 405 from the camera sensor 120. In an embodiment, the front-end processor 140 may estimate the depth value (d) of the image data by performing triangulation based on the first tracking coordinate ($x_V$) and the motion data.

In an embodiment, the front-end processor 140 may transmit data about the first tracking coordinate ($x_V$), the inertial pose (R,t), and the depth value (d) of the image data to the uncertainty estimation apparatus 110.

In an embodiment, a processor (e.g., the processor 115 of FIG. 1) of an uncertainty estimation apparatus (e.g., the uncertainty estimation apparatus 110 of FIG. 1) may acquire a second tracking coordinate ($x_m$) that is a motion-based tracking coordinate of the second image data 415 through Equation 2. The processor 115 may calculate Equation 2 based on data received from the front-end processor 140.

$$x_m = \pi[R\pi^{-1}[x_r, d] + t] \qquad \text{[Equation 2]}$$

At this time, in Equation 2, $\pi[\bullet]$ is a projection function that receives a 3D coordinate and outputs a coordinate (that is, two-dimensional (2D) coordinate) in an image, and $\pi^{-1}[\bullet, d]$ corresponds to a back-projection function that receives a 2D coordinate and a depth value in an image and outputs a 3D coordinate. The processor 115 may acquire a 3D coordinate 424 for the reference coordinate ($x_r$) 420 by calculating the reference coordinate ($x_r$) 420 of the first image data 405 according to a back-projection function $\pi^{-1}[x_r, d]$ based on the depth value (d) 422.

The processor 115 may acquire the 3D coordinate in the second image data 415 by applying an inertial pose (R,t) to the acquired 3D coordinate 424. That is, the processor 115 may perform a multiplication operation for multiplying the back-projection function $\pi^{-1}[x_r, d]$, which is the 3D coordinate 424 of the reference coordinate ($x_r$) 420, by R, which is a rotation value of the electronic device 100. Also, the processor 115 may perform a sum operation on a value $R\pi^{-1}[x_r, d]$, which is a result of the multiplication operation and t, which is a translation value of the electronic device 100. The processor 115 may determine a value $R\pi^{-1}[x_r, d]+t$, which is a result of performing the sum operation as the 3D coordinate in the second image data 415.

The processor 115 may acquire a second tracking coordinate ($x_m$) 440, which is a motion-based tracking coordinate, by calculating the 3D coordinate in the second image data 415 according to the projection function $\pi[R\pi^{-1}[x_r, d]+t]$.

Figure 5:
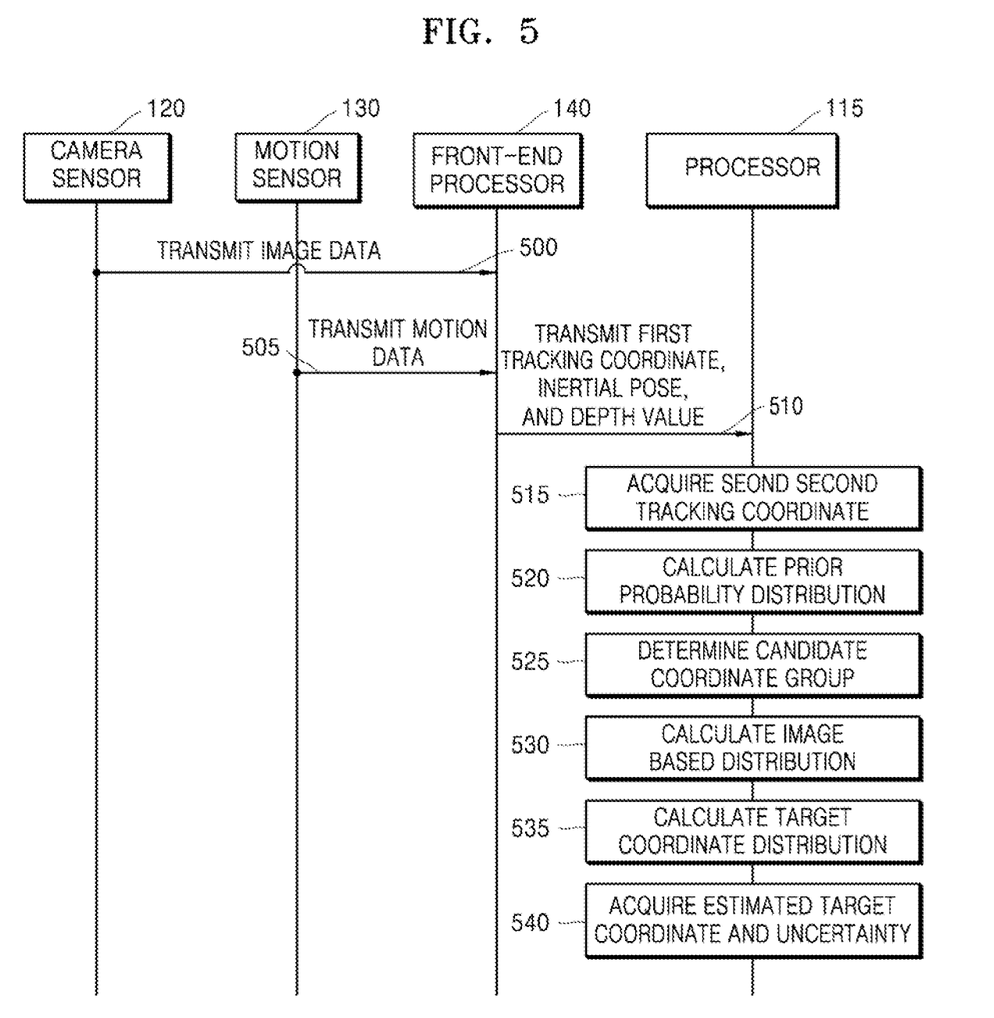
FIG. 5 is a detailed flowchart for explaining a method used by an apparatus to estimate an uncertainty of tracking a coordinate according to an embodiment.

FIG. 5 is a detailed flowchart for explaining a method for an apparatus to estimate the uncertainty of tracking a coordinate according to an embodiment.

Referring to FIG. 5, each of the camera sensor 120 and the motion sensor 130 may transmit acquired data to the front-end processor 140. For example, in operation 500, the camera sensor 120 that has acquired image data for a surrounding environment may transmit the image data to the front-end processor 140. As another example, in operation 505, the motion sensor 130 that acquires motion data by detecting rotation and translation of an electronic apparatus (e.g., the electronic apparatus 100 of FIG. 1) may transmit the motion data to the front-end processor 140.

FIG. 5 shows an embodiment in which the camera sensor 120 and the motion sensor 130 sequentially transmit the acquired data, but the disclosure is not limited thereto. Each of the camera sensor 120 and the motion sensor 130 may transmit the acquired data to the front-end processor 140 in parallel.

In an embodiment, the front-end processor 140 may process image data and motion data received from the camera sensor 120 and the motion sensor 130. For example, the front-end processor 140 may acquire a first tracking coordinate ($x_V$), which is an image-based tracking coordinate, based on the image data received from the camera sensor 120. The front-end processor 140 may estimate an inertia pose (R,t) of the electronic apparatus 100 based on the motion data received from the motion sensor 130. Also, the front-end processor 140 may estimate a depth value (d) of the image data based on the first tracking coordinate ($x_V$), which is an image-based tracking coordinate, and the motion data.

According to an embodiment, in operation 510, the front-end processor 140 may transmit data about the first tracking coordinate ($x_V$), the inertial pose (R,t), and the depth value (d) of the image data to the processor 115 of an uncertainty estimation apparatus (e.g., the uncertainty estimation apparatus 110 of FIG. 1).

According to an embodiment, in operation 515, the processor 115 may acquire a second tracking coordinate ($x_m$) that is a motion-based tracking coordinate of the second image data. For example, the processor 115 may acquire the second tracking coordinate ($x_m$) based on data of the reference coordinate ($X_r$), the inertial pose (R,t), and the depth value (d) of the image data that are received from the front-end processor 140.

In an embodiment, the processor 115 may calculate a target coordinate distribution in the second image data through a series of operations after acquiring the second tracking coordinate ($x_m$).

For example, in operation 520, the processor 115 may calculate a prior probability distribution. In the disclosure, the 'prior probability distribution' may denote a probability distribution for an arbitrary coordinate x sampled through the image-based tracking coordinate and the motion-based tracking coordinate. The prior probability distribution may denote a distance-based probability of an arbitrary coordinate x. The processor 115 may calculate a prior probability distribution with respect to the arbitrary coordinate x through Equation 3.

$$q(x|x_v, x_m) = \frac{1}{Z_{\alpha,\beta}} \exp[-\alpha(\beta|x - x_v| + (1 - \beta)|x - x_m|)] \quad \text{[Equation 3]}$$

That is, the processor 115 may calculate a prior probability distribution by using a weighted average of $|x-x_v|$, which is a distance value (e.g., a first distance value) between the arbitrary coordinate x and the image-based tracking coordinate ($x_V$), and $|x-x_m|$, which is a distance value (e.g., a second distance value) between the arbitrary coordinate x and the motion-based tracking coordinate ($x_m$).

In this case, β may be a weight parameter for balancing between the image-based tracking coordinate ($x_V$) and the motion-based tracking coordinate ($x_m$). In this case, β may be in a range of 0 to 1. For example, when a value (e.g., a value corresponding to the inertial pose (R,t)) included in the motion data is less than a preset value, because information acquired from the camera sensor 120 may be relatively more accurate, in order to increase the importance of the image based tracking coordinate ($x_V$) relative to the motion-based tracking coordinate ($x_m$), the value of β may be increased. As the value of β increases, the importance of the motion-based tracking coordinate ($x_m$) may decrease. α is a scale parameter, and $Z_{\alpha,\beta}$ may be a constant that is a normalization factor.

In an embodiment, the two parameters α and β may be adjusted by using probability density values of the image-based tracking coordinate ($x_V$) and the motion-based tracking coordinate ($x_m$) as in Equations 4 and 5.

$$q(x_v|x_r,x_m)=s \times q(x_m|x_r,x_m) \quad \text{[Equation 4]}$$

$$q(x_v|x_r,x_m)+q(x_m|x_r,x_m)=h \quad \text{[Equation 5]}$$

In this case, s may be a parameter for adjusting the relative importance of the image-based tracking coordinate ($x_V$) and the motion-based tracking coordinate ($x_m$), and h may be a parameter for adjusting the height of a prior probability distribution.

In operation 520, after calculating the prior probability distribution, the processor 115 may determine a candidate coordinate group in operation 525. For example, the processor 115 may determine a portion of the prior probability distribution having a prior probability equal to or greater than a threshold value as a candidate coordinate group. The processor 115 may select the smallest rectangular region including a contour line of the threshold value as the grid region (R). Accordingly, the selected grid region (R) may be determined differently according to the shape of the prior probability distribution.

In operation 530, the processor 115 may calculate an image-based distribution. For example, the processor 115 may calculate an image-based distribution based on the image similarity with the reference coordinate for the grid region R of the candidate coordinate group determined in operation 525. In this case, the image-based distribution may be calculated through Equation 6.

$$p_k(x|x_r) = \frac{1}{Z_k} \exp[k \times \text{image similarity}] \quad \text{[Equation 6]}$$

In this case, k may be a scale factor, and $Z_k$ may be a constant that is a normalization factor for the grid region (R). In an embodiment, k may be a scale factor that makes an image-based distribution ($p_k(x|x_r)$) and the prior probability distribution ($q(x|x_v,x_m)$) become similar, and k may be determined by minimizing KL-divergence that indicates a different degree of the two distributions.

In operation 535, the processor 115 may calculate a target coordinate distribution. For example, the processor 115 may calculate the target coordinate distribution based on the image-based distribution and the prior probability distribution. In this case, the target coordinate distribution may be calculated through Equation 7.

$$p_\lambda(x|x_r,x_v,x_m)=(p_k(x|x_r))^{1-\lambda}(q(x|x_v,x_m)) \quad \text{[Equation 7]}$$

The processor 115 may calculate a target coordinate distribution by using a weighted geometric mean of an image-based distribution and a prior probability distribution. In this case, λ may be a weight parameter for balancing the image-based distribution and the prior probability distribution, and may be in a range of 0 to 1.

The processor 115 may acquire a plurality of target coordinate distributions and a plurality of grid regions ($R_n$) by performing operations 520 to 535 with respect to a plurality of motion-based tracking coordinates (e.g., $x_m^1$, $x_m^2$, ..., $x_m^n$).

In operation 540, the processor 115 may acquire an estimated target coordinate and the uncertainty of the estimated target coordinate. For example, the processor 115 may acquire the estimated target coordinate (μ) based on a plurality of target coordinate distributions $p_\lambda(x|x_r,x_v,x_m^n)$, a weight $w_n$ corresponding to the accuracy of each of the plurality of motion-based tracking coordinates, and a plurality of grid regions $R_n$. The estimated target coordinate (μ) may be calculated through Equation 8.

$$\mu = \frac{1}{\sum_n |R_n|} \sum_n w_n \sum_{k \in R_n} x p_\lambda(x|x_r, x_v, x_m^n) \quad \text{[Equation 8]}$$

In addition, the processor 115 may acquire the uncertainty (Σ) of the estimated target coordinate based on the estimated target coordinate (μ). The uncertainty (Σ) of the estimated target coordinate may be calculated through Equation 9.

$$\sum = \frac{1}{\sum_n |R_n|} \sum_n w_n \sum_{k \in R_n} (x-\mu)^T (x-\mu) p_\lambda(x|x_r, x_v, x_m^n),$$ [Equation 9]

That is, the processor 115 may acquire the estimated target coordinate (μ) by calculating an average of a plurality of target coordinate distributions, and may acquire the uncertainty (Σ) of the estimated target coordinate by calculating a covariance matrix for the estimated target coordinate.

Figure 6:
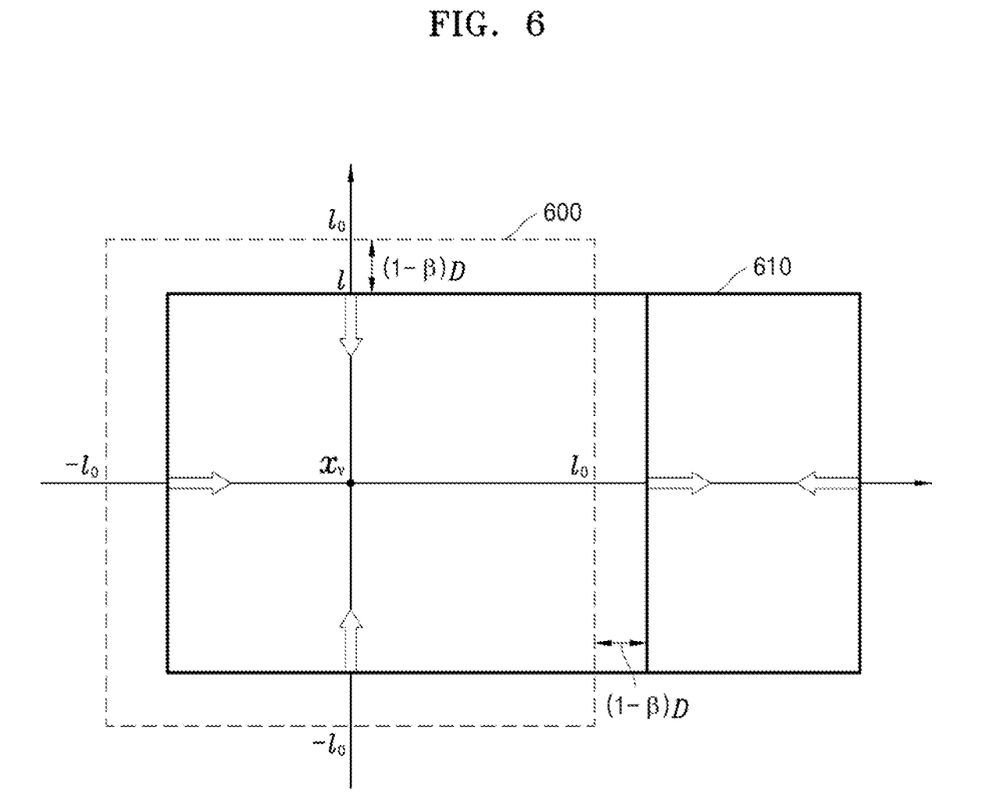
FIG. 6 is an example diagram for explaining a method used by an apparatus to determine a grid to sample image data, according to an embodiment.

FIG. 6 is an example diagram for explaining a method for an apparatus to determine a grid to sample image data, according to an embodiment.

Referring to FIG. 6, a processor (e.g., the processor 115 of FIG. 1) may select as a grid region (R) a portion of the prior probability distribution having a prior probability greater than or equal to a threshold value c from among the prior probability distributions calculated in operation 520 of FIG. 5.

In an embodiment, when an image-based tracking coordinate (e.g., the first tracking coordinate 430 of FIG. 4) and a motion-based tracking coordinate (e.g., the second tracking coordinate 440 of FIG. 4) are the same, the processor 115 may select a grid region 600 having a square shape. In this case, a length of one side of the grid region 600 may be $2l_0$. The value $l_0$ may be calculated through Equation 10.

$$l_0 = -\frac{1}{\alpha} \log c$$ [Equation 10]

In an embodiment, when the image-based tracking coordinate and the motion-based tracking coordinate are different from each other, the processor 115 may select a grid region 610 having a rectangular shape. For example, when D is less than $$\frac{l_0}{\beta},$$

the length of one side of the grid region 610 may be $2l_0$, and the length of the other side may be 2l. In this case, the value l may be $l_0-(1-\beta)D$. In another example, when D is greater than or equal to $$\frac{l_0}{\beta},$$

a length of one side of the grid region 610 may be $$\frac{2\beta l}{2\beta - 1},$$

and the length of the other side may be 2l.

Figure 7:
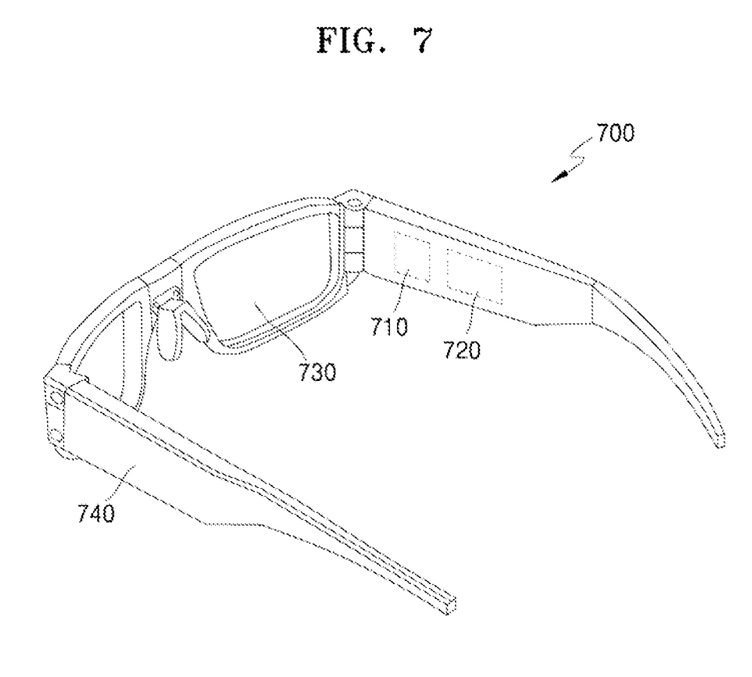
FIG. 7 is a perspective view of an electronic apparatus according to an embodiment.

FIG. 7 is a perspective view of an electronic apparatus 700 according to an embodiment.

Referring to FIG. 7, the electronic apparatus 700 according to an embodiment may include a data acquisition unit 710 and a processor 720. The electronic device 700 may estimate a current pose of the electronic apparatus and predict a future pose of the electronic apparatus based on the estimated current pose.

According to an embodiment, the electronic apparatus 700 may estimate a surrounding map of the electronic apparatus 700 and/or a current pose of the electronic apparatus 700 through simultaneous localization and mapping (SLAM).

In the disclosure, 'SLAM' may refer to a technique for acquiring information around an apparatus while moving in an arbitrary space, and estimating a map of the corresponding space and a current pose of the apparatus based on the acquired information, and the corresponding expression may be used in the same meaning below.

For example, the processor 720 of the electronic apparatus 700 may estimate a surrounding map and a current pose based on external data (e.g., image data, motion data, etc.) acquired through the data acquisition unit 710.

In the disclosure, the pose of the electronic apparatus may denote data including location information of the electronic apparatus, and the expression may be used in the same meaning below. In this case, the pose data may include 6DoF pose information, and the 6DoF pose information may include information indicating a position and information indicating an orientation of the electronic apparatus 700.

In an embodiment, the electronic apparatus 700 may be a wearable electronic apparatus that may be worn on a part of the user's body. For example, the electronic apparatus 700 may further include a lens 730 and a connector 740 for fixing at least one region of the electronic apparatus 700 to a part of the user's body.

In an embodiment, the electronic apparatus 700 may be a glasses type wearable electronic apparatus that may be worn on a user's ear as shown in FIG. 7, but is not limited thereto. In an embodiment, the electronic apparatus 700 may be a head mounted display (HMD) apparatus that may be worn on a user's head.

In an embodiment, the data acquisition unit 710 and the processor 720 may be arranged in the connection unit 740, but the arrangement structure of the data acquisition unit 710 and the processor 720 is not limited thereto. In an embodiment, the data acquisition unit 710 and/or the processor 720 may be arranged in a peripheral region (e.g., an edge) of the lens 730.

The electronic apparatus 700 may include optical components for emitting light including data for an augmented reality image and controlling a movement path of the emitted light. The processor 720 may emit light including data for the augmented reality image through the optical components, and cause the emitted light to reach the lens 730.

As the light including the data for the augmented reality image reaches the lens 730, an augmented reality image may be displayed on the lens 730, and the electronic apparatus 700 may provide the augmented reality image to the user (or the wearer) through processes described above.

In FIG. 7, only an embodiment in which the electronic apparatus 700 is a wearable electronic apparatus is illustrated, but an application field of the electronic apparatus (e.g., the electronic apparatus 100 of FIG. 1) is not limited thereto. According to an embodiment, the electronic apparatus 100 may also be applied to an unmanned aerial vehicle (UAV) and/or an autonomous vehicle capable of estimating a surrounding map and a current pose thereof through SLAM.

Although the embodiments have been described in detail above, the scope of the disclosure is not limited thereto, and various modifications and improvements by those skilled in the art using the basic concept of the disclosure as defined in the following claims are also within the scope of examples and embodiments of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An apparatus for estimating an uncertainty, the apparatus comprising:
   a processor configured to estimate an uncertainty of an image coordinate by executing at least one program, wherein the processor is further configured to:
      receive a first tracking coordinate that corresponds to a reference coordinate, the reference coordinate being included in first image data acquired by a camera sensor, wherein the first tracking coordinate comprises an image-based tracking coordinate in second image data acquired after the first image data;
      acquire, based on motion data acquired from a motion sensor and a depth value of the first image data, a second tracking coordinate that corresponds to the reference coordinate, wherein the second tracking coordinate comprises a motion-based tracking coordinate in the second image data;
      calculate a target coordinate distribution in the second image data based on the first tracking coordinate and the second tracking coordinate;
      acquire an estimated target coordinate and an uncertainty of the estimated target coordinate based on the calculated target coordinate distribution; and
      update the first tracking coordinate based on the estimated target coordinate,
   wherein the processor is further configured to:
   for each of a plurality of coordinates included in the second image data, calculate a weighted average of a first distance value and a second distance value, the first distance value being between an arbitrary coordinate and the first tracking coordinate and the second distance value being between the arbitrary coordinate and the second tracking coordinate;
   for each of the plurality of coordinates, calculate a prior probability distribution based on the calculated weighted average;
   determine a portion of the prior probability distribution having a prior probability greater than or equal to a threshold value as a candidate coordinate group; and
   calculate the target coordinate distribution based on the candidate coordinate group.

2. The apparatus of claim 1, wherein the processor is further configured to:
   acquire a first three-dimensional (3D) coordinate with respect to the reference coordinate based on the depth value of the first image data;
   convert the first 3D coordinate into a second 3D coordinate in the second image data based on the motion data; and
   acquire the second tracking coordinate by projecting the second 3D coordinate.

3. The apparatus of claim 1, wherein the processor is further configured to, for each of the plurality of coordinates, when a value included in the motion data is less than a preset value, set a weight parameter corresponding to the first distance value to be greater than a weight parameter corresponding to the second tracking coordinate.

4. The apparatus of claim 1, wherein the processor is further configured to calculate an image-based distribution based on image similarity with the reference coordinate for the determined candidate coordinate group.

5. The apparatus of claim 4, wherein the processor is further configured to calculate the target coordinate distribution based on the prior probability distribution and the image-based distribution.

6. The apparatus of claim 1, wherein the processor is further configured to transmit the updated first tracking coordinate and the uncertainty of the estimated target coordinate to an external apparatus.

7. The apparatus of claim 1, wherein the processor is further configured to estimate a target coordinate by calculating an average of the target coordinate distribution, and estimate the uncertainty of the estimated target coordinate by calculating a covariance matrix for the estimated target coordinate.

8. A method of estimating an uncertainty, the method comprising:
   receiving a first tracking coordinate that corresponds to a reference coordinate, the reference coordinate being included in first image data acquired by a camera sensor, wherein the first tracking coordinate comprises an image-based tracking coordinate in second image data acquired after the first image data;
   acquiring, based on motion data acquired from a motion sensor and a depth value of the first image data, a second tracking coordinate that corresponds to the reference coordinate, wherein the second tracking coordinate comprises a motion-based tracking coordinate in the second image data;
   calculating a target coordinate distribution in the second image data based on the first tracking coordinate and the second tracking coordinate;
   acquiring an estimated target coordinate and an uncertainty of the estimated target coordinate based on the calculated target coordinate distribution; and
   updating the first tracking coordinate based on the estimated target coordinate, and
   wherein for each of a plurality of coordinates included in the second image data, calculating a weighted average of a first distance value and a second distance value, the first distance value being between an arbitrary coordinate and the first tracking coordinate and the second distance value being between the arbitrary coordinate and the second tracking coordinate;
   for each of the plurality of coordinates, calculating a prior probability distribution based on the calculated weighted average;
   determining, from among the prior probability distributions, coordinates from among the plurality of coordinates having a prior probability greater than or equal to a threshold value as a candidate coordinate group for the estimated target coordinate; and
   calculating the target coordinate distribution based on the candidate coordinate group.

9. The method of claim 8, wherein the acquiring of the second tracking coordinate comprises:
   acquiring a first 3D coordinate with respect to the reference coordinate based on the depth value of the first image data;

converting the 3D coordinate into a second 3D coordinate in the second image data based on the motion data; and
acquiring the second tracking coordinate by projecting the converted second 3D coordinate.

10. The method of claim 8, further comprising calculating an image-based distribution for the determined candidate coordinate group based on image similarity with the reference coordinate.

11. The method of claim 10, further comprising calculating the target coordinate distribution based on the prior probability distribution and the image-based distribution.

12. The method of claim 8, further comprising transmitting the updated first tracking coordinate and the uncertainty of the estimated target coordinate to an external apparatus.

13. The method of claim 8, further comprising estimating a target coordinate by calculating an average of the target coordinate distribution, and estimating the uncertainty of the estimated target coordinate by calculating a covariance matrix for the estimated target coordinate.

14. An electronic apparatus for performing a simultaneous localization and mapping (SLAM) operation, the electronic apparatus comprising:
a camera sensor configured to acquire image data about a surrounding environment;
a motion sensor configured to acquire motion data by detecting a rotation and a movement of the electronic apparatus; and
a processor electrically connected to the camera sensor and the motion sensor, wherein the processor is configured to:
receive a first tracking coordinate that corresponds to a reference coordinate, the reference coordinate being included in first image data acquired by the camera sensor, the first tracking coordinate comprising an image-based tracking coordinate in second image data acquired after the first image data;
acquire, based on the motion data acquired from the motion sensor and a depth value of the first image data, a second tracking coordinate that corresponds to the reference coordinate and is a motion-based tracking coordinate in the second image data;
calculate a target coordinate distribution in the second image data based on the first tracking coordinate and the second tracking coordinate;
acquire an estimated target coordinate and an uncertainty of the estimated target coordinate based on the calculated target coordinate distribution; and
update the first tracking coordinate based on the estimated target coordinate,
wherein the processor is further configured to:
for each of a plurality of coordinates included in the second image data, calculate a weighted average of a first distance value and a second distance value, the first distance value being between an arbitrary coordinate and the first tracking coordinate and the second distance value being between the arbitrary coordinate and the second tracking coordinate;
for each of the plurality of coordinates, calculate a prior probability distribution based on the calculated weighted average;
determine a portion of the prior probability distribution having a prior probability greater than or equal to a threshold value as a candidate coordinate group; and
calculate the target coordinate distribution based on the candidate coordinate group.

15. The electronic apparatus of claim 14,
wherein the processor is further configured to:
acquire a first 3D coordinate with respect to the reference coordinate based on the depth value of the first image data;
convert the first 3D coordinate into a second 3D coordinate in the second image data based on the motion data; and
acquire the second tracking coordinate by projecting the converted second 3D coordinate.

16. The electronic apparatus of claim 14, further comprising a back-end processor configured to calculate a rotation angle and a position of the camera sensor,
wherein the processor is further configured to transmit the updated first tracking coordinate and the uncertainty of the estimated target coordinate to the back-end processor.

17. The electronic apparatus of claim 14,
wherein the processor is further configured to estimate a target coordinate by calculating an average of the target coordinate distribution, and estimate the uncertainty of the estimated target coordinate by calculating a covariance matrix with respect to the estimated target coordinate.

18. The apparatus of claim 1, wherein the processor is further configured to display an image corresponding to the updated first tracking coordinate.

* * * * *